Sept. 20, 1960     W. L. LEYDE ET AL     2,953,734

LINEAR RATE CONTROL CIRCUIT

Filed Sept. 2, 1950

WITNESSES:

INVENTORS
Warren L. Leyde and
Raymond J. Kowalesky.
BY
ATTORNEY

United States Patent Office 2,953,734
Patented Sept. 20, 1960

2,953,734
LINEAR RATE CONTROL CIRCUIT

Warren L. Leyde, Baltimore, and Raymond J. Kowalesky, Catonsville, Md., assignors to Westinghouse Electric Corporation, East Pittsburgh, Pa., a corporation of Pennsylvania Filed Sept. 2, 1950, Ser. No. 183,046

6 Claims. (Cl. 320—1)

This invention generally relates to the generation of control voltages, and more particularly to the generation of control voltages which vary linearly with respect to time at some determinable rate.

In the generation of certain control voltages, for example, a tracking gate voltage for use in the control of guided missiles and related bodies, it is necessary to provide a voltage which will have a linear variation for a time interval of at least several minutes and at a rate determined by a second voltage. The latter voltage can be derived from the range rate of change and is applied to the input of the generating circuit. It should be either manually adjustable or automatically controllable by some means, such as a radar tracking system. In addition, suitable reference voltages should be provided at desired levels which are dependent upon the required operational conditions.

In the prior art of which we are aware, a patent issued to Rieke, No. 2,452,683, shows a circuit arrangement for the generation of a cathode ray tube saw-tooth sweep voltage by rapidly charging a condenser from a suitable voltage source, and then discharging this same condenser through a resistor at a controllable rate. However, the condenser discharge voltage variation per se is not sufficiently linear with respect to time within the tolerances required by Rieke. Therefore, substantial linearity of this saw-tooth voltage wave form is obtained with an amplifier 10 arranged in the circuit for introducing a negative feed-back voltage component into the charging voltage which is applied across the condenser. For our purposes, Rieke merely teaches the broad combination of an integrating circuit with a negative feed-back circuit, the combination utilized for the provision of a saw-tooth voltage wave form which has a controlled linear variation with respect to time.

Another circuit arrangement of the prior art with which we are familiar is the cathode follower circuit as understood by those skilled in the electronics art. If an input signal is applied to the control grid of the ordinary cathode follower circuit, the output signal from across the cathode resistor does not follow said input signal in a truly linear manner as desired by the applicants. The cathode follower circuit introduces a small error, in the order of three or four volts for the purposes of the present application.

The specific problem confronting applicants was the generation of tracking gate voltages to control the flight of an airborne turbo-jet torpedo to be launched against primarily water surface craft. Such a torpedo can be dropped from an aircraft, and by means of a self-contained radar system, it travels toward a designated target on suitably provided integral wings. In the specific case of an underwater torpedo, the wings can be removed from the guided missile by a suitable detonation to cause said missile to drop into the water when at a relatively short distance from its target.

In the operational control of guided missiles, as above described, the radar tracking system generates control voltages which bracket an indicated target signal between an "early gate" signal pulse and a "late gate" signal pulse. However, in actual operation, it is feasible that the radar tracking system may lose its target for short time intervals. This could be due to numerous factors, such as radio interferences, and so forth. When the target is thus lost, a memory circuit is necessary to maintain a suitable tracking gate rate of change so the target signal, when it returns to the system, will still be properly coordinated and suitably bracketed between the aforesaid "early gate" and "late gate" signal pulses.

It is accordingly an object of our invention to provide a control voltage which varies linearly with respect to time at some adjustable rate.

Another object is to generate memory control voltages which are suitable for use in radar tracking systems to maintain control gate voltages at suitable levels when the target is temporarily undetected.

Still another object is to provide a circuit for generating control voltages which are suitable for use in radar tracking systems to change the tracking gate voltages at a rate determined by the rate of change in the effective distance between a moving body, such as a guided missile, and a designated target.

A further object is to provide control voltages which vary linearly with respect to time at some adjustable rate determined by the range rate of change.

A still further object is to furnish a circuit which is responsive to the difference between an "early gate" voltage or a "late gate" voltage and a target signal voltage.

An additional object is to provide a memory circuit for use in guided missile tracking systems such that the missile will continue in a direction toward the target even though the tracking system is temporarily unable to furnish a target signal.

A further additional object is to provide apparatus for generating linear control voltages which is superior to prior art apparatus.

A still further additional object is to provide apparatus of the type generally described herein which is suitable for use with guided missiles respecting size, weight and durability, in particular.

Our invention concerns a circuit arrangement for obtaining a D.C. reference voltage which has a linear variation with respect to time at some adjustable rate. Primarily, a resistor and two condenser elements are arranged in a circuit with an amplifier, such that a given input voltage which is impressed across one of the condensers will cause a voltage drop across the resistor corresponding to said input voltage, and the latter voltage drop will charge the other condenser at a determinable rate. An output voltage taken from across the resistor and said other condenser will have a linear change rate with respect to time. The aforesaid amplifier compensates to effect this linear change rate.

The novel features that we consider characteristic of our invention are set forth with particularity in the appended claims. The invention itself, however, both as to its organization and its method of operation, together with additional objects and advantages thereof, will best be understood from the following specific embodiment when read in connection with the accompanying drawings in which:

Figure 1:
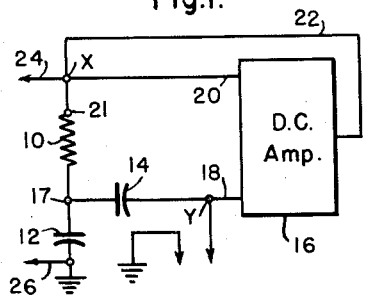
Figure 1 is a schematic diagram of a basic voltage circuit.

The apparatus shown in Figure 1 includes a serially connected resistor 10 and first condenser 12. A second condenser 14 is connected between the input 18 to a D.C. amplifier 16 and the junction 17 between said resistor 10 and first condenser 12. Connections are provided to apply a suitable input signal between the latter D.C. amplifier input 18 and ground, across said first condenser 12 and said second condenser 14. A second input 20 to the D.C. amplifier 16 is connected to the end 21 of said resistor 10 opposite the aforesaid junction 17 between the resistor 10 and first condenser 12. An output 22 from the D.C. amplifier 16 is connected to this latter end 21 of the resistor 10. The output signal from the circuit is taken from across the serially connected resistor 10 and first condenser 12 through leads 24 and 26. The side of the first condenser 12 opposite said junction 17 and the lead 26 is grounded.

Figure 2:
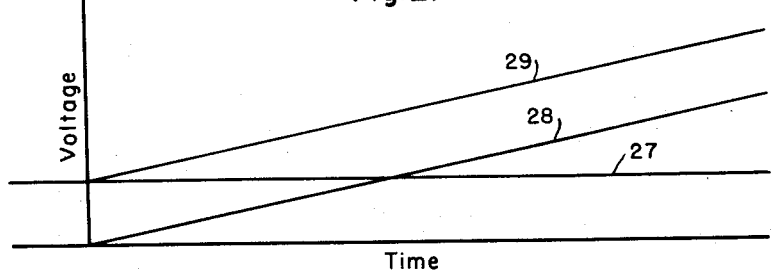
Fig. 2 shows the voltage curves for the condensers shown in Figure 1.

The curves shown in Fig. 2 illustrate the voltage conditions across the two condensers 12 and 14 of Figure 1, when a voltage, as represented by the lower curve 27, is applied across the second condenser 14. The middle curve 28 shows the charging voltage which builds up across the first condenser 12 as a result of the aforesaid voltage being applied across the second condenser 14. The upper curve 29 is proportioned to the combination voltage which is taken from across the serially connected resistor 10 and first condenser 12.

Figure 3:
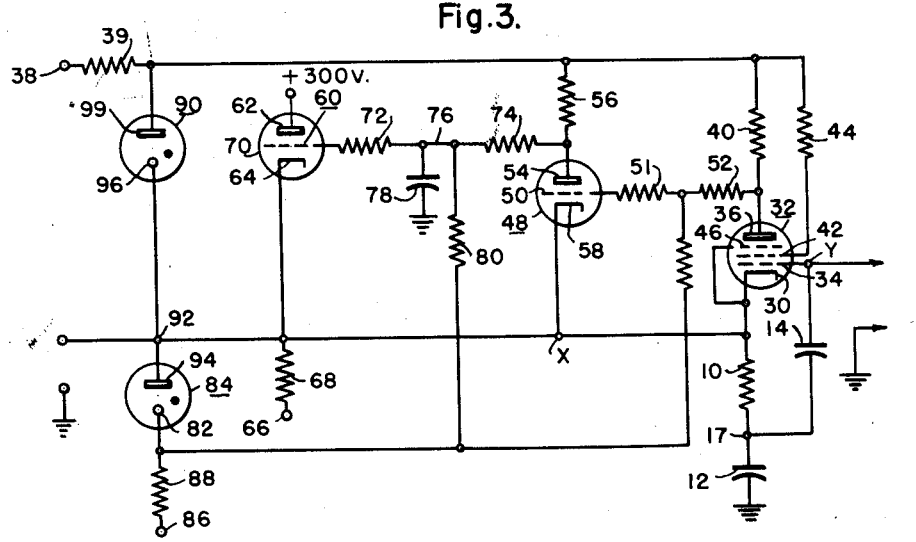
Fig. 3 is a detailed schematic diagram of the apparatus in accordance with our invention.

In the apparatus shown in Fig. 3, the resistor 10 and first condenser 12 of Figure 1 are shown connected between the cathode 30 of a pentode amplifier 32 and ground. The second condenser 14 is shown connected between the junction 17 of the latter resistor 10 and first condenser 12 and the control grid 34 of said pentode amplifier 32. The plate 36 of this tube is connected to a suitable plate supply voltage terminal through a load resistor 40. The screen grid 42 is connected to the same plate voltage supply terminal 38 through a suitable dropping resistor 44. The suppressor grid 46 is connected to the cathode 30. A triode tube 48 is connected as an amplifier with its control grid 50 connected to the plate 36 of the pentode amplifier 32 through suitable bias resistors 51 and 52. The plate 54 of the latter triode amplifier 48 is connected to the plate voltage supply terminal 38 through a load resistor 56. The cathode 58 is connected to the cathode 30 of the pentode amplifier 32. A second triode tube 60 is connected as a cathode follower with its plate 62 connected to a suitable plate voltage supply and its cathode 64 connected to a suitable negative voltage supply terminal 66 through a cathode resistor 68. The control grid 70 of the cathode follower connected triode 60 is connected to the plate 54 of the triode amplifier 48 through suitable resistors 72 and 74. The latter resistors have a common center connection 76 which is fastened to ground through a by-pass condenser 78. This latter connection 76 is also connected through a suitable resistor 80 to a cathode 82 of a voltage regulator tube 84. Said cathode 82 is connected to a suitable negative supply terminal 86 through a cathode resistor 88. This voltage regulator tube 84 is connected through a second regulator voltage tube 90 to the positive plate voltage supply terminal 38 through a common drop resistor 39. The cathode 64 of the cathode follower triode 60 is connected to the common junction 92 between the plate 94 of the first voltage regulator tube 84 and the cathode 96 of the second voltage regulator tube 90 and the cathode 58 of the triode amplifier 48 and the cathode 30 of the pentode amplifier 32. Connections are provided to apply an input signal to the over-all circuit between ground and the control grid 34 of the pentode amplifier 32. Connections are provided to remove an output control signal from the circuit between ground and the common junction 92 between the plate 94 of the first voltage regulator tube 84 and the cathode 96 of the second voltage regulator tube 90.

In the operation of the apparatus shown in Figure 1, if by some means a first reference point X and a second reference point Y can be kept at relatively constant potentials, with zero current flow between them, any voltage which is impressed on the second condenser 14 will cause a corresponding voltage to appear across the resistor 10. This will result in the first condenser 12 changing at a rate dependent upon the voltage initially applied across the second condenser 14. If the voltage initially applied across the second condenser 14 is of a constant value, the first condenser 12 will charge at a constant rate and an output signal voltage taken across the serially connected resistor 10 and first condenser 12 will change at a linear rate with respect to time. The derivative of the latter output signal voltage, with respect to time, will then be proportional to the voltage impressed across the second condenser 14 and can be determined as desired.

To keep the potential difference between reference point X and second reference point Y relatively constant at all times, the potential of first reference point X and the potential of second reference point Y is respectively fed into a D.C. amplifier, which amplifies any difference between these potentials and changes the potential of reference point X in such a manner as to cancel out this difference. This will result in no current flow between these respective reference points X and Y and the voltage impressed on the second condenser 14 will cause a corresponding voltage across the resistance 10 to result in the desired charging of the first condenser 12.

The curves of Fig. 2 bring out the abovedescribed relationships between the voltage impressed on the second condenser 14 and the resultant charging voltage across the first condenser 12.

In the operation of the apparatus shown in Fig. 3, the desired output control voltage is removed between ground and the junction 92 between the plate 94 of the first voltage regulator tube 84 and the cathode 96 of the second voltage regulator tube 90. This output control voltage can be made to vary linearly over a several minute time period at a rate dependent upon the voltage impressed across the second condenser 14 shown connected between the control grid 34 of the pentode amplifier 32 and the junction 17 between the resistance 10 and first condenser 12 in the cathode circuit of said pentode amplifier 32. The voltage regulator tubes 90 and 84 are provided to establish voltage levels respectively a fixed amount above and below the aforesaid output signal voltage. An input signal is applied between ground and the control grid 34 of the pentode amplifier 32. This input signal causes a charge to build up across the second condenser 14. This charge, after a short time interval, is, in effect, a memory charge. This input signal can be either positive or negative as will be later explained. Assuming it to be negative for the purposes of explanation, the plate 36 of the pentode amplifier 32 will go positive when its grid 34 goes negative. When the latter plate 36 goes positive, the control grid 50 of the triode amplifier 48 goes positive to cause the latter triode amplifier 48 to conduct. This results in the plate 54 of the triode amplifier 48 going negative to cause the control grid 70 of the cathode follower triode 60 to be correspondingly negative. The cathode 64 of the latter cathode follower triode 60 will follow its grid 70 in a negative direction to cause the common junction 92 to accordingly decrease in potential in a negative direction. The cathode 30 of the pentode amplifier 32 similarly follows the potential of the cathode 64 of the cathode follower triode 60. The output voltage is, in effect, actually the sum of the charging voltage on the second condenser 14 and the integral of the rate of change voltage on the first condenser 12 as these elements are presently connected. The voltage of the control grid 34 of the pentode amplifier 32 is accordingly equal to the sum of the voltages on the first condenser 12 and the second condenser 14 respecting ground. Therefore, the output voltage taken from the circuit between ground and the common junction 92 connected to the cathode 64 of the cathode follower tube 60 will be seen to follow the memory charge building up across the second condenser 14.

In the control of a guided missile, a radar transmitter generally generates a tracking pulse which is in the form of a saw-tooth voltage. The output signal voltage from the apparatus shown in Fig. 3 is in the form of a D.C. reference voltage which shifts its position in either a positive or a negative direction corresponding to the polarity of the input signal applied across the second condenser 14 to the control grid 34 of the pentode amplifier tube 32. This D.C. reference voltage is superimposed upon the aforesaid saw-tooth tracking pulse to result in the generation of a tracking gate consisting of an "early gate" pulse voltage and a "late gate" pulse voltage. The radar tracking system in an independent circuit generates a target signal pulse corresponding to the range of some designated target with respect to the guided missile. This latter target signal pulse is bracketed by the radar system through another circuit between an "early gate" voltage pulse and a "late gate" voltage pulse. If the target signal pulse and either the "early gate" voltage pulse or the "late gate" voltage pulse overlaps in position, then a respectively negative or positive signal is applied as the input signal across the second condenser 14 and to the control grid 34 of the pentode amplifier 32 shown in Fig. 3.

Assuming that the "early gate" voltage pulse overlaps with the target signal pulse, a negative input signal is applied to the control grid 34 of the pentode amplifier 32 to result in the D.C. reference voltage, which is the output signal voltage, decreasing in a negative direction an amount corresponding to the overlap of the "early gate" voltage pulse and the target signal pulse.

The generation of the saw-tooth tracking pulse is well known in the prior art. The generation of tracking gate voltage pulses is considered to be well known in the prior art. The application of the respective tracking gate voltage pulses to suitable mixer circuits to respond to the overlap between said tracking gate voltage pulse and the target signal pulse is considered to be well known in the prior art.

The output signal voltage, in the form of a D.C. reference voltage, can be considered to be taken from across the series resistor 10 and first condenser 12 connected between ground and the cathode 30 of the pentode amplifier 32. In the practical operation of applicants' circuit, this output signal voltage is in the form of a voltage drop primarily across the series condenser 12, and is in the order of approximately 200 volts. The voltage drop across the resistor 10 is in the order of only a few volts. The charging voltage, which builds up across the second condenser 14 is in the order of only about two or so volts. The positive plate voltage terminal 38 is connected to a source in the order of 300 volts, and the negative supply voltage terminals 66 and 86 are connected to sources in the order of minus 500 volts. The output voltage is practically utilized as a range correction voltage to function as a memory to the tracking gate control of a guided missile should the target signal voltage disappear temporarily. This results in the tracking gate voltage pulses changing at a range rate such that when the target signal voltage pulse reappears, it will still be bracketed respectively between the "early gate" tracking voltage pulse and the "late gate" voltage pulse, although the guided missile has, during the interim time period, been approaching the designated target.

Although we have shown and described certain specific embodiments of our invention, we are fully aware that many modifications thereof are possible. Our invention, therefore, is not to be restricted except insofar as is necessitated by the prior art and without departing from the spirit of the appended claims.

We claim as our invention:

1. In a circuit for maintaining a substantially constant potential difference between a first and a second reference point to obtain an output voltage which varies linearly with respect to time, the combination including a series-connected resistance element and capacitance element having a common junction, said resistance element being connected between said first reference point and said junction, said capacitance element being connected between said junction and ground potential, a second capacitance element connected between said junction and said second reference point, an amplifier having at least a first input, a second input and an output, said first and second inputs being respectively connected to detect the potential difference between said first and second reference points, and said output being connected to apply a combination potential to one of said reference points.

2. The apparatus according to claim 1, with first connections for applying an input signal voltage across said second capacitance element, and second connections for taking said output voltage from across said series-connected resistance element and capacitance element.

3. In apparatus for providing an output voltage which varies linearly with respect to time at an adjustable rate, the combination of an amplifier having at least a first input circuit, a second input circuit and an output circuit, a resistance member having one end respectively connected to the first input circuit and to the output circuit of said amplifier, a first capacitance member connected between a point of ground potential and the other end of said resistance member to form a common junction with said resistance, a second capacitance member connected between said junction and the second input circuit of said amplifier.

4. The apparatus according to claim 3, with first connections for applying an input voltage across said second capacitance member, and second connections for removing said output voltage from across said resistance member and said first capacitance member.

5. In apparatus for providing an output voltage which varies linearly with respect to time, the combination of an amplifier having at least a first input circuit, a second input circuit and an output circuit, a resistance member having one end connected respectively to the first input circuit and to the output circuit of said amplifier, a first capacitance member connected between a point of ground potential and the other end of said resistance member to form a common junction with the latter, a second capacitance member connected between said common junction and the second input circuit of said amplifier, first connections for applying an input signal voltage across said first and second capacitance members, and second connections for removing said output voltage from across said resistance member and said first capacitance member.

6. In a circuit for maintaining a substantially constant voltage difference between a first and a second reference point in the circuit, the combination including a series-connected resistance element and first capacitance element having a common junction between them, said resistance element connected between said first reference point and said junction, said first capacitance element connected between said junction and ground potential, a second capacitance element connected between said junction and said second reference point, an amplifier having at least a first input circuit, a second input circuit and an output circuit, said first and second input circuits being respectively connected to said first and said second reference points to detect the voltage difference therebetween, said output circuit being connected to apply a compensation voltage to one of said reference points, first connections for applying an input signal voltage across said first and said second capacitance members, and second connections for removing an output signal voltage from across said series-connected resistance element and first capacitance element.

References Cited in the file of this patent

UNITED STATES PATENTS

| | | |
|---|---|---|
| 2,219,195 | Norgaard | Oct. 22, 1940 |
| 2,337,911 | Mayer et al. | Dec. 28, 1943 |
| 2,398,916 | Brewer | Apr. 23, 1946 |